United States Patent
Tougas et al.

(10) Patent No.: US 11,893,570 B1
(45) Date of Patent: Feb. 6, 2024

(54) TOKEN BASED DEMAND AND REMAND SYSTEM

(71) Applicant: UIPCO, LLC, San Antonio, TX (US)

(72) Inventors: Brian Tougas, Spring Branch, TX (US); Carl Mehner, San Antonio, TX (US); Jennifer Hunt Erickson, San Antonio, TX (US); Sean Carl Mitchem, San Antonio, TX (US); Brian F. Shipley, San Antonio, TX (US); Joel S. Hartshorn, Liberty Lake, WA (US); Nolan Serrao, Plano, TX (US); Ji Qi, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/953,837

(22) Filed: Nov. 20, 2020

Related U.S. Application Data (60) Provisional application No. 62/939,497, filed on Nov. 22, 2019.

(51) Int. Cl.
    *G06Q 20/32* (2012.01)
    *G06Q 20/20* (2012.01)
    (Continued)

(52) U.S. Cl.
    CPC ....... *G06Q 20/3276* (2013.01); *G06K 7/1095* (2013.01); *G06K 7/1417* (2013.01); *G06K 19/06037* (2013.01); *G06K 19/06112* (2013.01); *G06Q 20/02* (2013.01); *G06Q 20/208* (2013.01); *G06Q 20/209* (2013.01); *G06Q 20/227* (2013.01); *G06Q 20/389* (2013.01); *G06Q 20/40145* (2013.01); *G06Q 30/0185* (2013.01); *G06Q 40/02* (2013.01); *H04L 63/083* (2013.01);
    (Continued)

(58) Field of Classification Search
    CPC .. G06Q 20/3276; G06Q 20/02; G06Q 20/208; G06Q 20/209; G06Q 20/227; G06Q 20/389; G06Q 20/40145; G06Q 30/0185; G06Q 40/02; G06Q 2220/00; G06K 7/1095; G06K 7/1417; G06K 19/06037; G06K 19/06112; H04L 63/083; H04L 63/0861; H04W 12/06
    See application file for complete search history.

(56) References Cited

U.S. PATENT DOCUMENTS

8,944,328 B2 * 2/2015 Lawson .............. G06F 16/9554
                                                        235/472.01
9,489,673 B2   11/2016 Randazza et al.
(Continued)

*Primary Examiner* — Peter Ludwig
(74) *Attorney, Agent, or Firm* — Perkins Coie LLP (57) ABSTRACT

A system is described to authorize a transaction using blockchain technology. For example, a transaction authorization system comprises a point of sale (POS) device, a mobile device, and a payment blockchain. The POS device can initiate a transaction by scanning one or more items to be purchased and generating a code comprising a transaction identifier and a total cost of the one or more items. The mobile device can receive the code and can generate a token comprising the transaction identifier, total cost, a selected payment method identifier, and a value that can identify an account of a person associated with the mobile device. The token is sent to a payment blockchain to authorize the transaction.

17 Claims, 7 Drawing Sheets

(51) Int. Cl.
*G06Q 20/38* (2012.01)
*G06Q 20/02* (2012.01)
*G06Q 30/00* (2012.01)
*G06Q 20/22* (2012.01)
*G06Q 40/02* (2012.01)
*G06Q 20/40* (2012.01)
*H04L 9/40* (2022.01)
*G06Q 30/018* (2023.01)
*G06K 19/06* (2006.01)
*G06K 7/10* (2006.01)
*G06K 7/14* (2006.01)
*H04W 12/06* (2021.01)

(52) U.S. Cl.
CPC ......... *H04L 63/0861* (2013.01); *H04W 12/06* (2013.01); *G06Q 2220/00* (2013.01)

(56) References Cited

U.S. PATENT DOCUMENTS

| | | | | |
|---|---|---|---|---|
| 10,332,117 B2* | 6/2019 | Krause | | G07G 1/00 |
| 10,521,776 B2* | 12/2019 | Zhou | | H04L 9/3239 |
| 10,580,049 B2 | 3/2020 | Graylin | | |
| 10,713,457 B2* | 7/2020 | Sun | | G06K 19/06037 |
| 11,250,229 B2* | 2/2022 | Zhang | | G07G 1/0045 |
| 2012/0267432 A1* | 10/2012 | Kuttuva | | G06Q 20/3276 |
| | | | | 235/379 |
| 2012/0271712 A1* | 10/2012 | Katzin | | G06Q 20/387 |
| | | | | 705/14.51 |
| 2012/0310760 A1* | 12/2012 | Phillips | | G06Q 20/3278 |
| | | | | 705/26.1 |
| 2014/0100973 A1* | 4/2014 | Brown | | G06Q 20/322 |
| | | | | 705/17 |
| 2014/0175167 A1* | 6/2014 | Argue | | G06Q 30/0633 |
| | | | | 235/383 |
| 2014/0249901 A1* | 9/2014 | Qawami | | G06Q 20/12 |
| | | | | 705/14.17 |
| 2015/0025969 A1* | 1/2015 | Schroll | | G06Q 20/208 |
| | | | | 705/14.64 |
| 2015/0302398 A1* | 10/2015 | Desai | | G06Q 20/401 |
| | | | | 705/41 |
| 2015/0379552 A1* | 12/2015 | Kent | | G06Q 20/202 |
| | | | | 705/14.38 |
| 2016/0012465 A1* | 1/2016 | Sharp | | G06Q 20/321 |
| | | | | 705/14.17 |
| 2017/0301047 A1 | 10/2017 | Brown et al. | | |
| 2018/0293834 A1* | 10/2018 | Cage | | G07F 17/3223 |
| 2019/0102756 A1* | 4/2019 | Zhou | | G09C 5/00 |
| 2019/0147477 A1* | 5/2019 | Nazarowski | | H04L 63/0807 |
| | | | | 705/14.27 |
| 2019/0222242 A1* | 7/2019 | Frank | | H04B 1/109 |
| 2019/0325407 A1* | 10/2019 | Zhou | | G06Q 20/4014 |
| 2020/0005281 A1* | 1/2020 | Patel | | G06Q 20/3255 |
| 2020/0082459 A1* | 3/2020 | Varma | | G06Q 30/0643 |
| 2020/0134601 A1* | 4/2020 | Ding | | G06Q 20/40145 |
| 2020/0167775 A1* | 5/2020 | Reese | | G06Q 20/38215 |
| 2020/0364666 A1* | 11/2020 | Nam | | G06Q 50/265 |
| 2020/0380495 A1* | 12/2020 | Kang | | G06K 7/1417 |
| 2021/0192491 A1* | 6/2021 | Rosenberg | | G06K 7/10722 |
| 2021/0192528 A1* | 6/2021 | Zhao | | G06V 40/172 |

\* cited by examiner

TOKEN BASED DEMAND AND REMAND SYSTEM

CROSS-REFERENCE TO RELATED APPLICATION(S)

This application is a non-provisional of and claims priority to U.S. Provisional Application No. 62/939,497, filed on Nov. 22, 2019, entitled "TOKEN BASED DEMAND AND REMAND SYSTEM," which is hereby incorporated by reference in its entirety for all purposes.

BACKGROUND

Shopping at a physical retail store involves a familiar process. A consumer first obtains one or more items from the retail store, and then the consumer stands in a checkout line to purchase the one or more items. Often, the consumer pays for the one or more items using a physical credit card or a digital credit card stored on the consumer's mobile device. The physical or digital credit card information can be obtained by a point of sale (POS) device that can send such information to a server on the Internet so that a bank can authorize the transaction involving the one or more items.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while embodiments of the present disclosure are amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

Conventional transaction technology involving point of sale (POS) devices present security issues at least because a POS device can obtain sensitive electronic card related information from an electronic card and can send such sensitive personal information to a server. An unauthorized person can hack the POS device and/or the server to obtain the sensitive personal information. Thus, one of the technical problems with conventional transaction technology is that it does not proactively protect users' sensitive personal information from being sent between devices as the users seek to perform a transaction.

To overcome at least this technical problem, among others, the embodiments of the present disclosure generally relate to systems and methods to authorize a person's transaction based on a token provided by a person's mobile device (e.g., smart phone, watch, etc.) to a POS device, where the token may include a transaction identifier (ID), total cost of the transaction, payment method identifier, and a value that can uniquely identify the person associated with the mobile device or that can uniquely identify an account being used for the transaction. The token does not include sensitive electronic card related information (e.g., the entire credit card numbers, entire bank number, etc.). In some embodiments, a series of smart contracts and distributed ledgers can be used to authorize a transaction without providing the merchant with any personally identifying information. Although this application specifically discusses one or more blockchains, any type of distributed ledger can be used.

The POS device can send a first demand message/transaction comprising the token to an identity verification server that determines and verifies the user's identity and determines a payment blockchain to which a second demand message should be posted. The identity verification server posts a second demand message/transaction that notifies the payment issuer of the selected payment method (e.g., based on the payment method identifier in the token) of the request for payment for the transaction. Once the payment issuer is aware of the outstanding request for payment based on the second demand message/transaction posted to the payment blockchain, the payment issuer server can determine whether the transaction should be authorized based on the information included in the token (e.g., value that can identify the person/account and total cost). The payment issuer server can post a remand message/transaction to the payment blockchain initiating and/or issuing payment to the merchant associated with the POS device based on the information included in the token (e.g., value that can identify the person/account and total cost). Upon initiating payment, the POS device can receive a message from the payment blockchain that indicates that the transaction is authorized.

Figure 1:
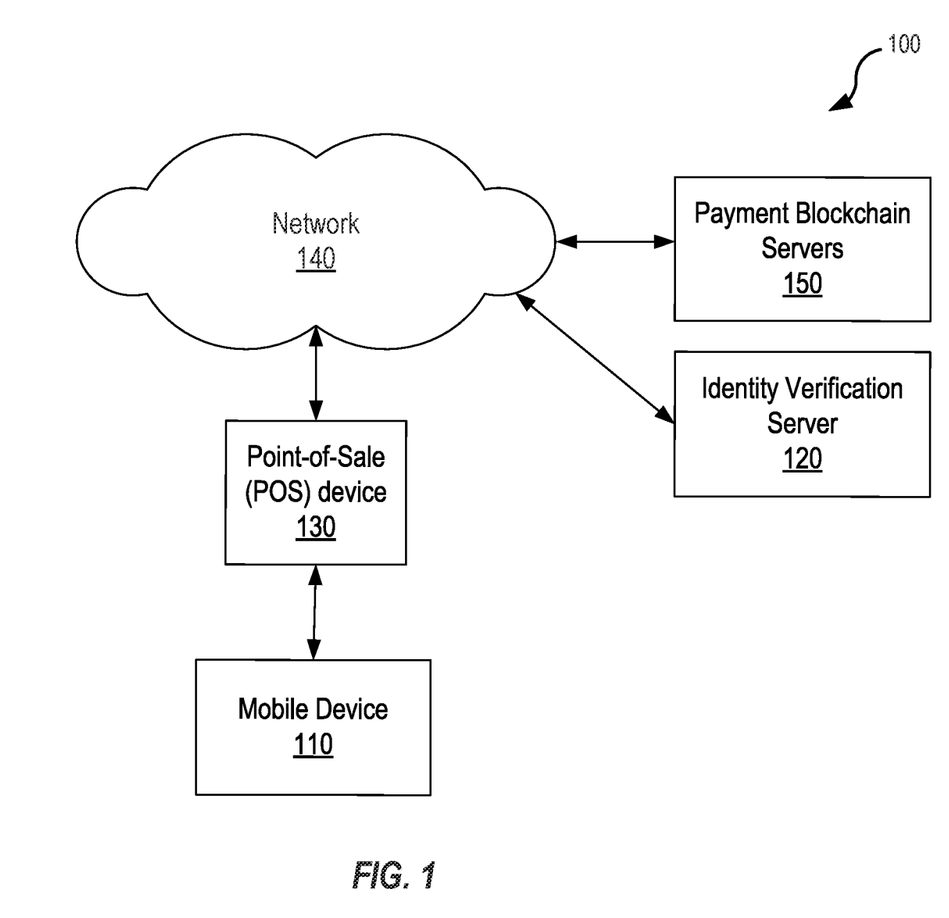
FIG. 1 shows an example of an operating environment for a transaction authorization system.

FIG. 1 shows an example of an operating environment for a transaction authorization system 100 that authorizes a transaction without sending sensitive electronic card information over a network. An overview of the transaction authorization system 100 is first presented below, followed by a detailed presentation of the operations performed by the various systems and devices of the transaction authorization system 100. The transaction authorization system 100 includes at least the following three systems, devices or servers that collect and/or analyze token information provided by a mobile device 110 associated with a person: (1) a POS device 130, (2) an identity verification server 120, and (3) a payment blockchain 150. The mobile device 110 may store one or more electronic card information associated with the person to whom the mobile device 110 may belong.

A POS device 130 can initiate a transaction by scanning one or more items to be purchased by the person. For example, the POS device 130 may include a barcode scanner that can scan the one or more items to be purchased. The POS device 130 can generate and display a code (e.g., a quick response (QR) code, a barcode, etc.) that can include transaction identifying information such as transaction identifier and a total cost of the one or more items to be purchased. The mobile device 110 can authenticate the person operating the mobile device via a passcode or biometric information (e.g., fingerprint). After authenticating the person, the mobile device 110 can receive or scan the code and can generate a token information that includes at least the transaction identifier and the total cost provided by receiving or scanning the code. The mobile device 110 can allow the person operating the mobile device 110 to select a payment method from a list of one or more payment methods (e.g., from a list comprising two credit cards, or a credit card and a debit card). The generated token information can also include information that identifies the selected payment method and a value that uniquely identifies the person whose identity is authenticated by the mobile device or that uniquely identifies an account being used to perform the transaction.

The mobile device 110 can send the token information to the POS device 110 that can generate and post a first demand message/transaction comprising the token information to the identity verification server 120. The POS device 130 can communicate with the identity verification server 120 and the identity verification server 120 can communicate with an issuer of the payment method and/or the payment blockchain servers 150 via a network 140 (e.g., the Internet). In some embodiments, the mobile device 110 can directly generate and post the first demand message/transaction comprising the token information to the identity verification server 120 via the Internet. In some embodiments, the POS device 13- or the mobile device 110 can post a demand transaction directly on the payment blockchain.

After receiving the first demand on the identity verification server 120, the identity verification server 120 determines and verifies the identity of the person and which payment blockchain to which the demand should be sent. In some embodiments, a plurality of payment blockchain servers 150 may be operated by various banks. In such implementations, the first identity verification identity verification server 120 also determines the payment blockchain the demand should be sent using payment information in the token and sends the second demand message/transaction to the payment blockchain servers 150 associated with the selected payment method. In some embodiments, the token does not include payment information and instead the payment information can be stored with the identity verification server 120 and determined based on the user's identity and stored preferences. The issuer of the selected payment method is notified of the demand when the second demand message/transaction is posted on the payment blockchain servers 150. The issuer of the selected method of payment can determine whether the transaction is authorized, and can deny the transaction or post a remand transaction initiating payment on the payment blockchain.

The payment identifier related information included in the token (if included) is not associated with a person's financial information. For example, the payment identifier does not include the entire credit card number, bank number, or other sensitive information. Thus, the transmission of the payment identifier over the network 140 does not expose the person operating the mobile device 110 to a security risk. However, the payment identifier may identify a bank or a payment blockchain so that identity verification server 120 can determine the identity of the issuer of the selected method of payment and can send a demand to the determined payment blockchain server to authorize the transaction.

In some embodiments, the payment identifier may be a pseudo-random value that includes at least some values that can be used by the identity verification server 120 (e.g., using a look-up table) to determine the identity of the payment blockchain. In some embodiments, the payment identifier may include a portion of the credit card number, bank number, or other sensitive information without compromising security.

After the identity verification server 120 determines an identity of a proper payment blockchain servers 150, the identity verification server 120 can generate and post a second demand message/transaction on the payment blockchain servers 150. The second demand message includes the token information and may include, for example, an IP address of the payment blockchain server 150. The second demand message notifies the issuer of the payment method of the request for payment. The issuer or the payment blockchain servers 150 can determine whether the transaction initiated by the POS device 130 is authorized based at least in part on the token information. For example, the payment blockchain servers 150 may authorize the transaction based on at least the value that identifies the person who wants to purchase the item(s) or that identifies an account being used to perform the transaction and based on the total cost included in the token. Upon determining that the transaction is authorized, the payment issuer can post a remand transaction on the payment blockchain server 150 that initiates a payment to a merchant associated with the POS device 130. In some embodiments, upon determining that the transaction is authorized, the payment blockchain server 150 can send a message to the POS device that indicates that the transaction is authorized. In some embodiments, the POS device can send the demand directly to the payment blockchain server based on the payment identifier information in the token, assuming the POS device is given access to the information in the token.

Figure 2:
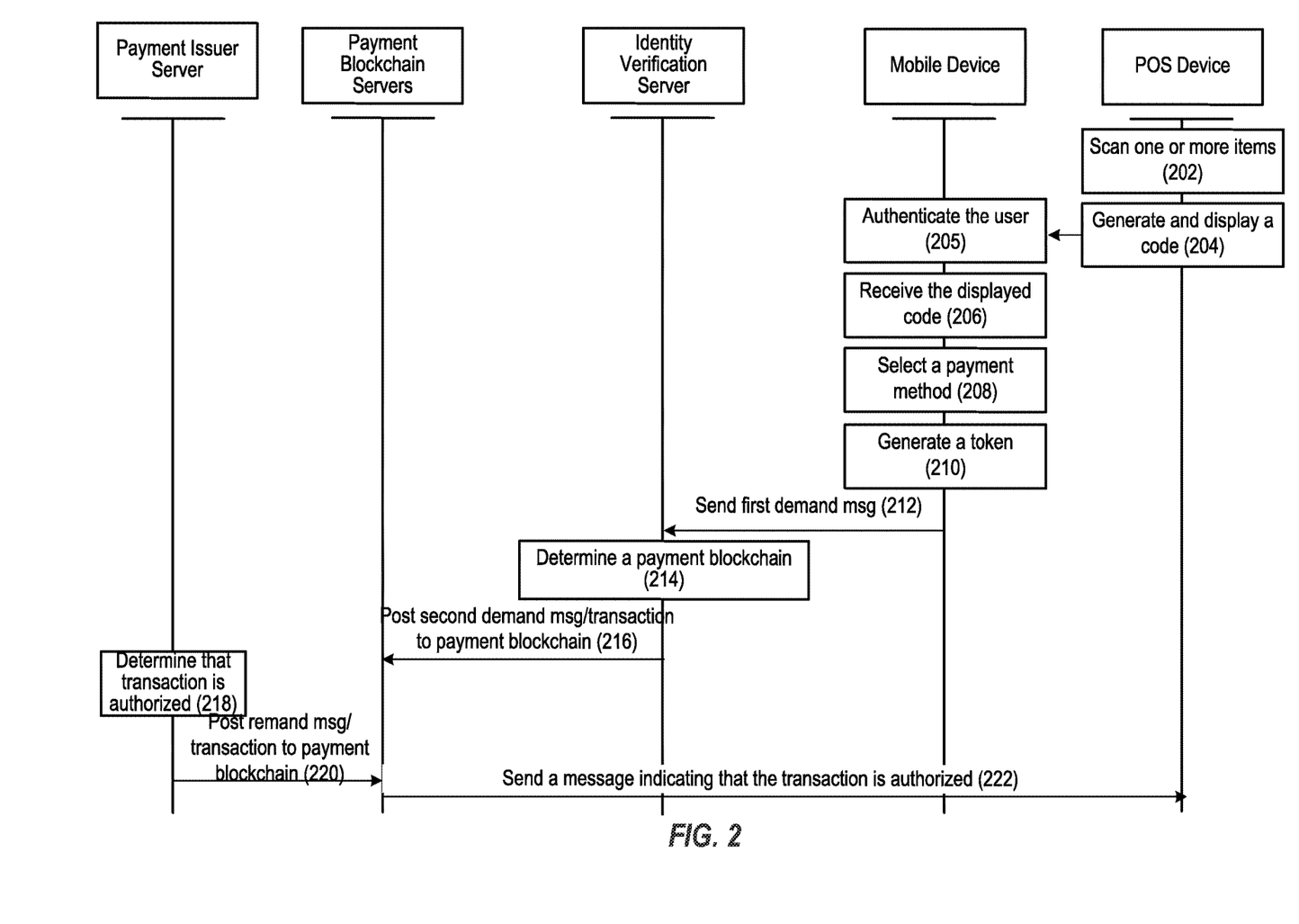
FIG. 2 shows an example process performed by a transaction authorization system.

FIG. 2 shows an example process performed by a transaction authorization system. At operation 202, a scanner of a POS device can scan one or more items to be purchased by the person. The POS device may include a barcode scanner (shown in 340 of FIG. 3) that can scan the one or more items to be purchased. At operation 204, when a person operating the POS device indicates that a total number of items to be purchased have been scanned (e.g., by clicking a "pay" button on the POS device), a code generation module (shown as 360 in FIG. 3) of the POS device can generate code and can display the code via a display (shown as 350 in FIG. 3) associated with the POS device. The generated code may be a QR code, a barcode, or any other type of visual code that can be optically scanned by the mobile device's camera. The generated code can include transaction identifying information such as transaction identifier and a total cost of the one or more items to be purchased. The transaction identifier may be a randomly generated number that can uniquely identify the transaction.

At operation 205, the authentication module of the mobile device (shown as 470 in FIG. 4) receives personal information about the person operating the mobile device. For example, the user may enter his or her passcode on the mobile device's display or biometric information via a biometric scanner (e.g., fingerprint information via fingerprint scanner, voice via microphone, or facial information via camera). At operation 205, the authentication module of the mobile device can determine that the person operating the mobile device is authenticated if the authentication module determines that the received personal information is same as previously stored personal information on the mobile device.

Figure 4:
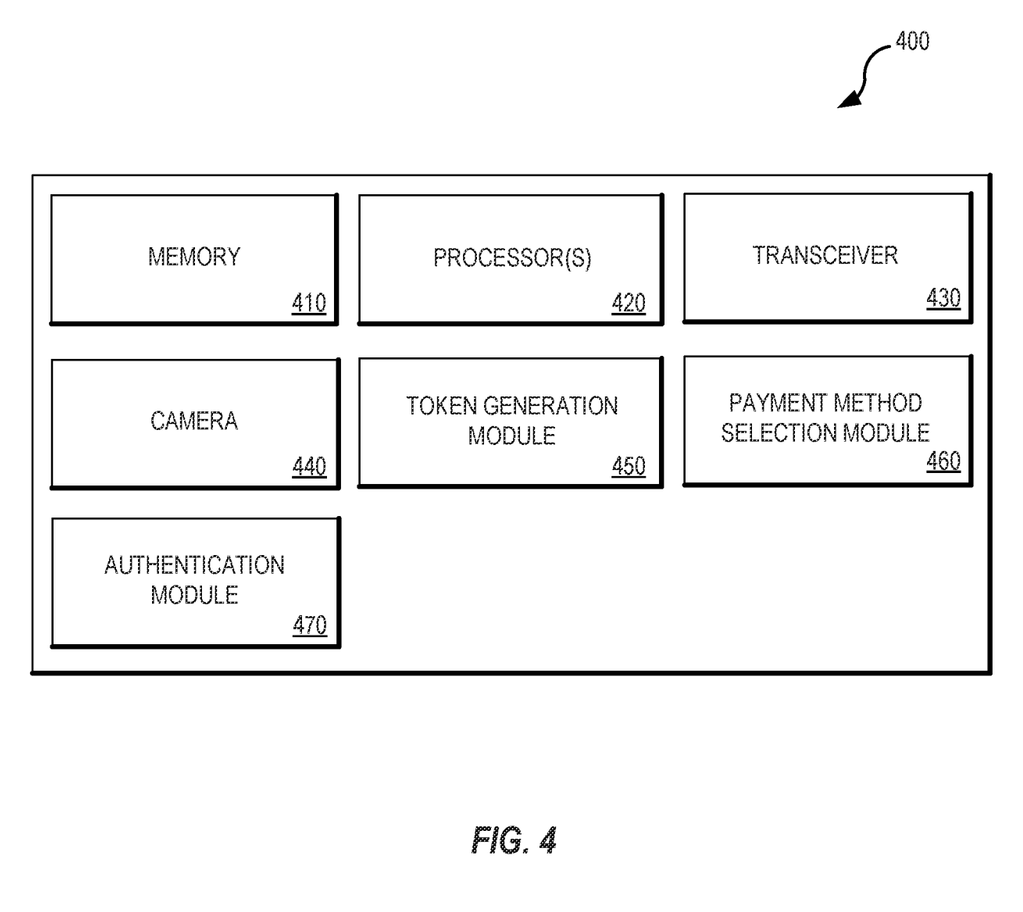
FIG. 4 shows a block diagram of a mobile device.

At operation 206, the person operating the mobile device can receive the code via, for example, the mobile device's camera (shown as 440 in FIG. 4). After the code is received, at operation 208, a payment method selection module of the mobile device (shown as 460 in FIG. 4) can display on the mobile device a list of one or more payment methods from which the person operating the mobile device can select a payment method. The payment method selection module includes a list of one or more payment identifiers associated with the list of one or more payment methods so that upon selection of the payment method, the payment method selection module can send a payment identifier for the selected payment method to the token generation module.

After operations 206 and 208, a token generation module of the mobile device (shown as 450 in FIG. 4) can generate a token that includes at least the transaction identifier and the total cost provided by the received code. The token generation module can also include in the token a payment identifier that identifies the selected payment method. For example, a payment identifier may be a 16-bit value where at least some of the bits can identify a bank and/or type of payment (e.g., credit card or debit card). The token generation module can also include in the token a value that uniquely identifies the person whose identity is authenticated by the mobile device or that uniquely identifies an account being used to perform the transaction. The value may be an encrypted account number that can enable a transaction authorization module of the payment blockchain server (shown as 580 in FIG. 5B) to decrypt the value and identify an account of the person and authorize transaction involving the purchase the one or more items for the identified account.

At operation 212, the token generation module of the mobile device can generate and send a first demand message comprising the token to the identity verification server. In some embodiments, the token generation module of the mobile device can send the token to the identity verification server via the POS device so that the token is first sent to the POS device, where the code generation module of the POS device can generate and send the first demand message comprising the token information to the identity verification server. The generated first demand message may be an IP packet that include in the IP packet's destination field an IP address of the identity verification server.

At operation 214, the payment blockchain determination module of the identity verification server (shown as 540 in FIG. 5A) can determine an identity of the payment blockchain server. The payment blockchain determination module can obtain the payment identifier and determine, e.g., based on a look-up table, an IP address of the payment blockchain server associated with the payment identifier. For example, a payment identifier can indicate that the person operating the mobile device has selected a credit card by Bank ABC so that the payment blockchain determination module can use the payment identifier information to send a demand to a payment blockchain associated with Bank ABC.

After the payment blockchain server can be identified, at operation 216, the payment blockchain determination module can generate and send a second demand message to the payment blockchain server. The second demand message may include the token information obtained by the identity verification blockchain server. The second demand message may be an IP packet that include in the IP packet's destination field an IP address of the payment blockchain server. The second demand message can notify a payment issuer server to determine whether the transaction is authorized. In some embodiments, a transaction authorization module of the payment blockchain server to determines whether the transaction is authorized.

At operation 218, the payment issuer server may authorize the transaction based on the information included in the token (e.g., the total cost and the value that uniquely identifies the person or an account being used to perform the transaction). At operation 220, to authorize the transaction, the payment issuer server can post a remand message/transaction to the payment blockchain servers which initiates a payment to a merchant associated with the POS device. At operation 222, the transaction authorization module can send a message to the POS device indicating that the transaction is authorized.

Figure 3:
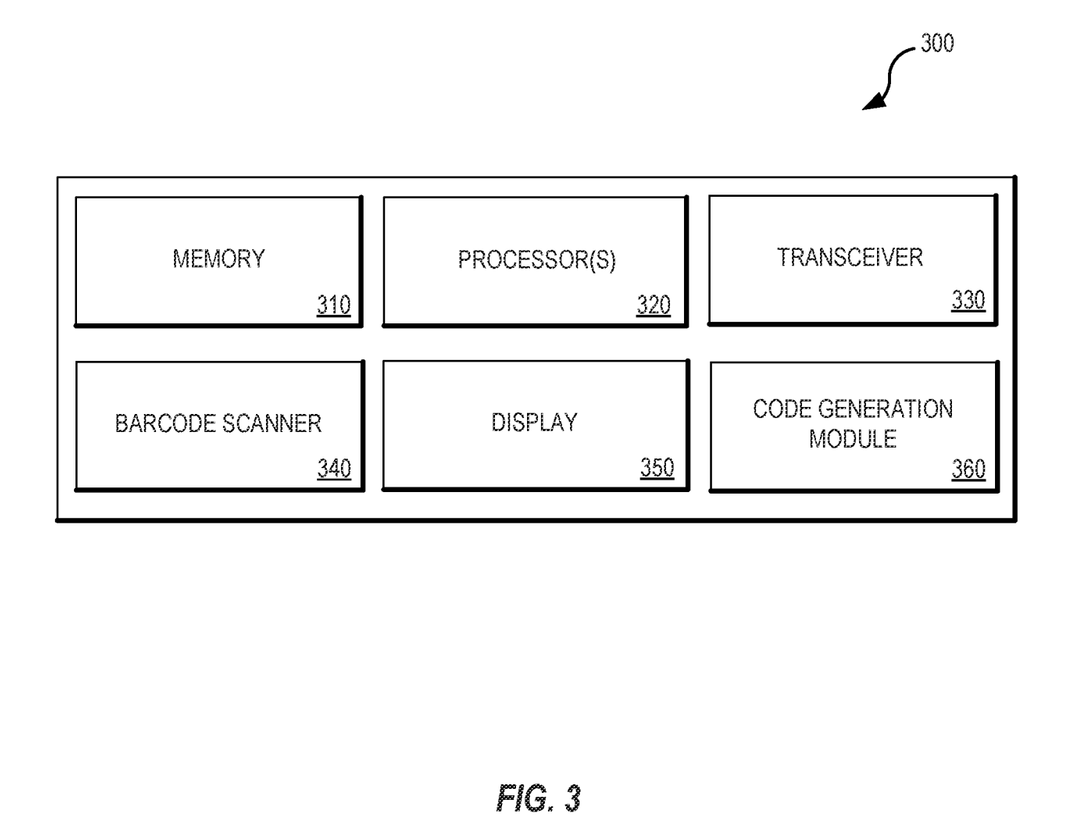
FIG. 3 shows a block diagram of a point of sale (POS) device.

FIG. 3 shows a block diagram of a POS device. The POS device 300 includes at least one processor 320 and a memory 310 having instructions stored thereupon. The instructions upon execution by the processor 320 can configure the POS device 300 to operate the barcode scanner 340 to scan one or more items and to generate a code using the code generation module 360 as described in FIGS. 2 and 6 and/or in the various embodiments in this patent document. The generated code may include a unique transaction identifier and a total cost of the one or more items to be purchased. The code generation module can send the generated code to the display 350 to be displayed. The POS device 300 includes a transceiver 330 that includes a receiver (e.g., using Bluetooth or near-field communication (NFC) technology, etc.) that can receive token information from the mobile device.

FIG. 4 shows a block diagram of a mobile device. The mobile device 400 includes at least one processor 420 and a memory 410 having instructions stored thereupon. The instructions upon execution by the processor 420 configure the mobile device 400 to perform the operations described for the camera 440, token generation module 450, payment method selection module 460, and authentication module 470 as described in FIGS. 2 and 6 and/or in the various embodiments in this patent document. The mobile device 400 includes a transceiver 430 that includes a transmitter to send a generated token information to the POS device or to the identity verification server.

Figure 5A:
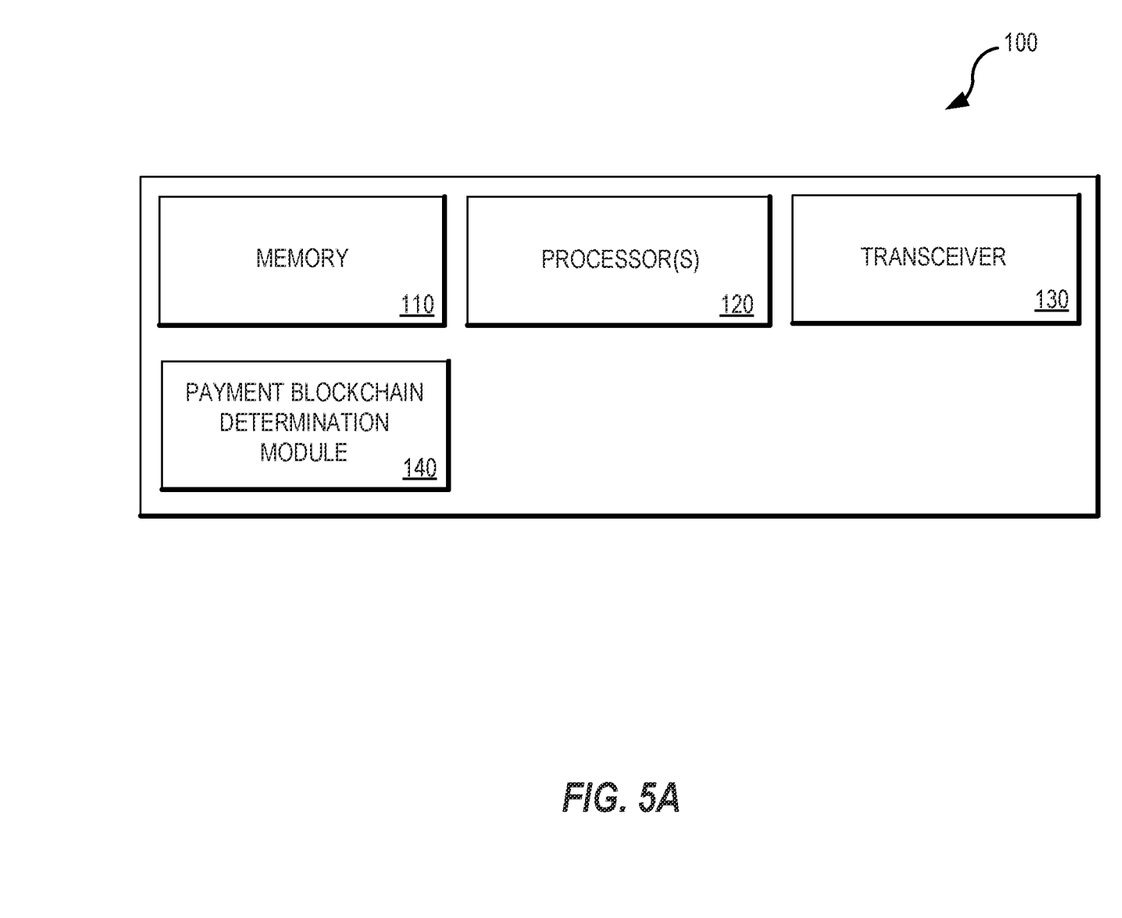
FIG. 5A shows a block diagram of an identity verification server.

FIG. 5A shows a block diagram of an identity verification server. The identity verification server 500 includes at least one processor 520 and a memory 510 having instructions stored thereupon. The instructions upon execution by the processor 520 configure the identity verification server 500 to perform the operations described for the payment blockchain determination module 540 as described in FIGS. 2 and 6 and/or in the various embodiments in this patent document. The personal information server 500 includes a transceiver 530 that includes a transmitter to send a demand message comprising the token information to a determined payment blockchain server. In some embodiments, the identity verification server can instead be an identity verification blockchain or other distributed ledger.

Figure 5B:
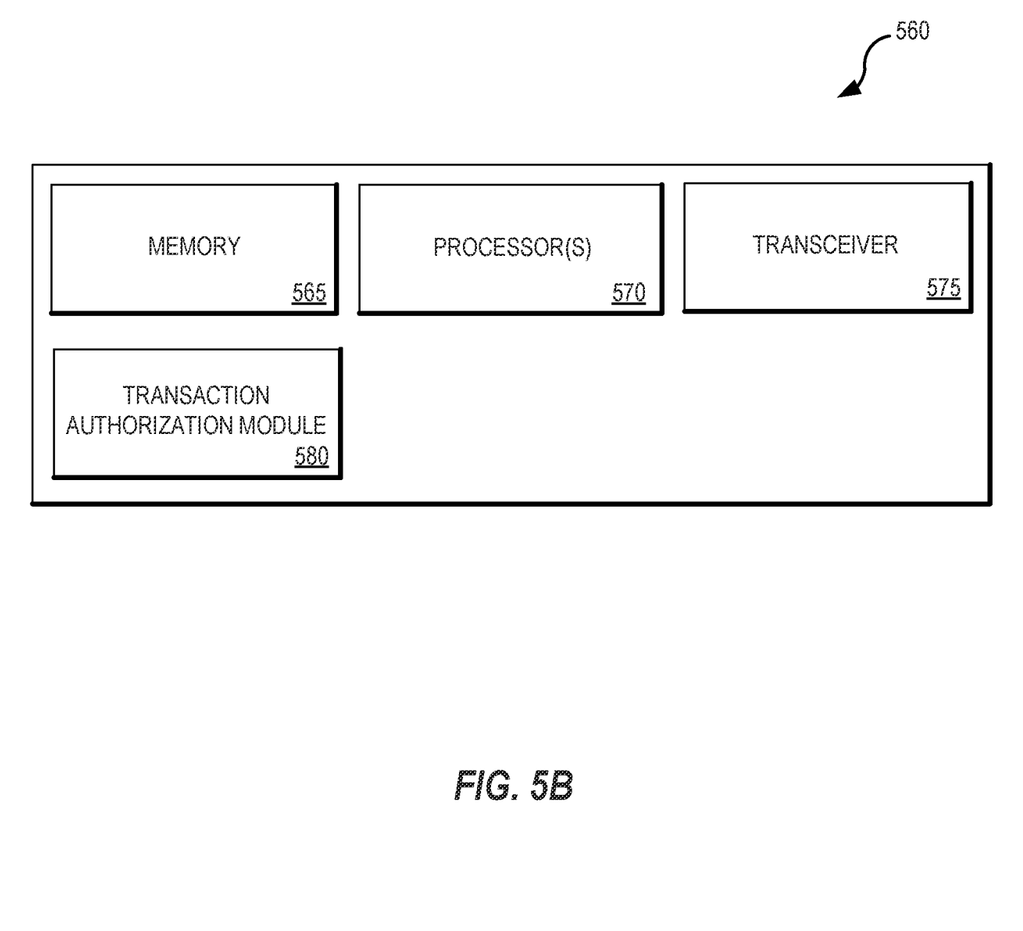
FIG. 5B shows a block diagram of a payment blockchain server.

FIG. 5B shows a block diagram of one of the payment blockchain servers. The payment blockchain server 550 includes at least one processor 570 and a memory 565 having instructions stored thereupon. The instructions upon execution by the processor 570 configure the payment blockchain server 550 to perform the operations described for the transaction authorization module 580 as described in FIGS. 2 and 6 and/or in the various embodiments in this patent document. The payment blockchain server 550 includes a transceiver 575 that includes a receiver to receive the demand message from the identity verification server and includes a transmitter to send a message to the POS device indicating that the transaction has been authorized and/or the payment for the transaction has been initiated.

Figure 6:
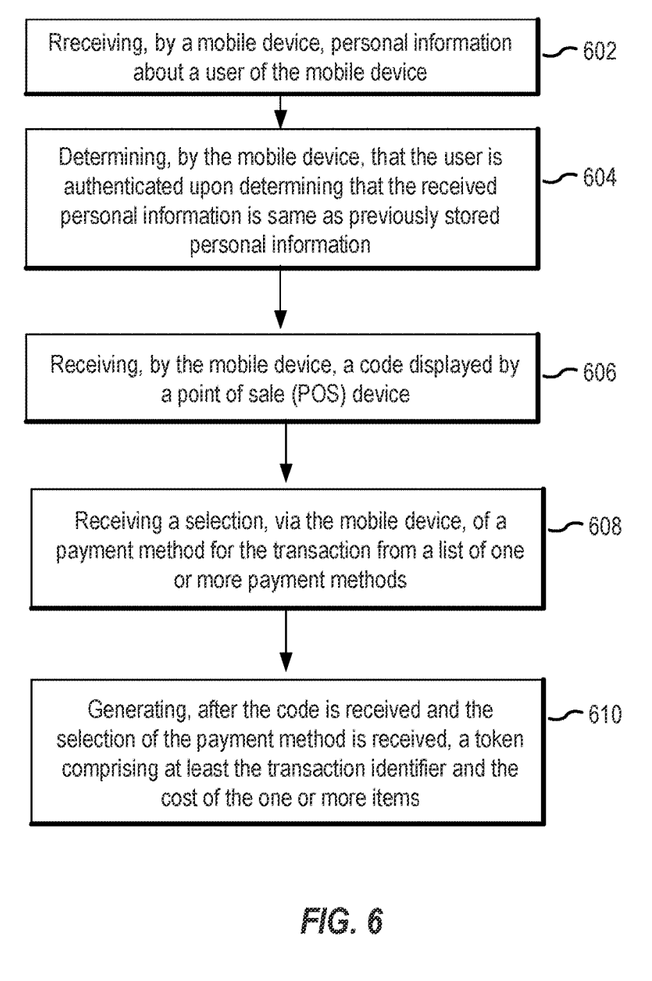
FIG. 6 shows a flowchart for authorizing a transaction.

FIG. 6 shows a flowchart for authorizing a transaction. At operation 602, an authentication module of the mobile device receives personal information about a user of the mobile device. For example, the personal information may include biometric information of the user or a passcode. At operation 604, the authentication module determines that the user is authenticated upon determining that the received personal information is same as previously stored personal information. After the mobile device performs operations 602 and 604, the various modules of the mobile device can perform operations 606 to 610.

At operation 606, the token generation module of the mobile device can receive a code displayed by a point of sale (POS) device. For example, the mobile device's camera can take a picture or scan the code displayed by the POS device where the code includes a transaction identifier for a transaction involving a purchase of one or more items scanned by the POS device and a cost of the one or more items.

At operation 608, the payment module selection module of the mobile device receives a selection, via the mobile device, of a payment method for the transaction from a list of one or more payment methods. The list of one or more payment methods may include a first credit card from a first bank, a second credit card from a second bank, or a debit card from the first bank.

At operation 610, the token generation module of the mobile device generates, after the code is received and the selection of the payment method is received, a token comprising at least the transaction identifier and the cost of the one or more items. The generated token also includes a first part (or one part) of the token that is generated based on a payment identifier associated with the selected payment method, and a second part (or another part) of the token that is generated based on a value that uniquely identifies the user or an account of the user. In some embodiments, the token does not include a credit card number, a bank number, or a debit card number associated with the selected payment method.

The token generation module may generate and send a first demand message comprising the generated token to an identity verification server. In some embodiments, the token generation module may send the generated token to the POS device whose code generation module can generate and send the first demand message comprising the generated token to the identity verification server. The payment blockchain determination module of the identity verification server is configured to send, to a payment blockchain identified by information in the token, a second demand transaction that notifies a provider of the selected payment of the transaction and that includes the information included in the token. The payment blockchain determination module can identify the payment blockchain based on the first part of the token that is generated based on the payment identifier.

The transaction authorization module of the payment blockchain (or a server associated with the payment issuer) is configured to determine that the transaction is authorized based on the information included in the token, and to post a remand transaction on the payment blockchain that initiates a payment to a merchant associated with the POS device. For example, the transaction authorization module of the payment blockchain can determine that the transaction is authorized based on the cost of the one or more items being less than a pre-determined limit (e.g., credit card or debit card limit) for an account associated with the user, where the account is identified based on the second part of the token that uniquely identifies the user or the account of the user. The transaction authorization module can, upon determining that the transaction is authorized, send a message to the POS device where the message indicates to the POS device that the transaction is authorized.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A transaction authorization system, comprising:
    a point-of-sale (POS) device configured to:
        scan one or more items to be purchased;
        generate and display a machine-readable visual code for a transaction involving the one or more items to be purchased, wherein the machine-readable visual code comprises a transaction identifier for the transaction and a cost of the one or more items to be purchased;
    a mobile device configured to:
        receive personal information about a user of the mobile device;
        determine that the user is authenticated upon determining that the received personal information is same as previously stored personal information;
        after determining that the user is authenticated:
            receive, from the POS device, the machine-readable visual code for the transaction;
            receive a selection of a payment method for the transaction from a list of one or more payment methods;
            generate, after the machine-readable visual code is received and the payment method selection is received, a token comprising at least the transaction identifier and the cost of the one or more items, wherein a first part of the token is generated based on a payment identifier associated with the selected payment method, and wherein a second part of the token is generated based on a value that uniquely identifies the user or an account of the user;
        post a demand message to a payment blockchain identified by information in the token,
            wherein the demand message notifies a provider of the selected payment method,
            wherein the provider of the selected payment method posts a remand transaction to the payment blockchain; and
    the POS device further configured to receive, from the payment blockchain, a message indicating that the transaction is authorized.

2. The system of claim 1, wherein the mobile device is configured to send the token to the POS device that is configured to generate and send the demand message to the payment blockchain.

3. The system of claim 1, further comprising an identity verification server configured to:
    receive a first demand message and send the demand message to the payment blockchain, wherein the payment blockchain is based either on information retrieved by the identity verification server or by the first part of the token that is generated based on the payment identifier.

4. The system of claim 1, wherein the remand transaction occurs based on the cost of the one or more items and the second part of the token that is generated based on the value that uniquely identifies the user or the account of the user.

5. The system of claim 1, wherein the token does not include a credit card number, a bank number, or a debit card number associated with the selected payment method.

6. The system of claim 1, wherein the list of one or more payment methods includes a first credit card from a first bank, a second credit card from a second bank, or a debit card from the first bank.

7. The system of claim 1, wherein the personal information includes biometric information of the user or a passcode.

8. A transaction authorization method, comprising:
    receiving, by a mobile device, personal information about a user of the mobile device;
    determining, by the mobile device, that the user is authenticated upon determining that the received personal information is same as previously stored personal information;
    after the determining that the user is authenticated:

receiving, by the mobile device from a point of sale (POS) device, a machine-readable visual code for the transaction, wherein the machine-readable visual code includes a transaction identifier for a transaction involving a purchase of one or more items scanned by the POS device and a cost of the one or more items;

receiving a selection, via the mobile device, of a payment method for the transaction from a list of one or more payment methods;

generating, after the machine-readable visual code is received and the selection of the payment method is received, a token comprising at least the transaction identifier and the cost of the one or more items, wherein a first part of the token is generated based on a payment identifier associated with the selected payment method, and wherein a second part of the token is generated based on a value that uniquely identifies the user or an account of the user;

wherein a first demand message comprising the generated token is sent to an identity verification server, wherein the identity verification server is configured to post, to a payment blockchain identified by information in the token, a second demand transaction that notifies a provider of the selected payment of the transaction and that includes the information included in the token, wherein the provider of the selected payment method posts a remand transaction to the payment blockchain, and wherein the POS device is configured to receive, from the payment blockchain, a message indicating that the transaction is authorized.

9. The method of claim 8, wherein the mobile device sends the token to the POS device, wherein the POS device is configured to generate and send the first demand message to the identity verification server.

10. The method of claim 8, wherein the token does not include a credit card number, a bank number, or a debit card number associated with the selected payment method.

11. The method of claim 8, wherein the list of one or more payment methods includes a first credit card from a first bank, a second credit card from a second bank, or a debit card from the first bank.

12. The method of claim 8, wherein the personal information includes biometric information of the user or a passcode.

13. A non-transitory computer readable program storage medium storing instructions that, when executed by a processor, causing the processor to implement a method comprising:

receiving, by a mobile device, personal information about a user of the mobile device;

determining, by the mobile device, that the user is authenticated upon determining that the received personal information is same as previously stored personal information;

after determining that the user is authenticated:

receiving, by the mobile device from a point of sale (POS) device, a machine-readable visual code for a transaction, wherein the machine-readable visual code includes a transaction identifier for a transaction involving a purchase of one or more items scanned by the POS device and a cost of the one or more items;

receiving a selection, via the mobile device, of a payment method for the transaction from a list of one or more payment methods;

generating, after the machine-readable visual code is received and the selection of the payment method is received, a token comprising at least the transaction identifier and the cost of the one or more items, wherein a first part of the token is generated based on a payment identifier associated with the selected payment method, and wherein a second part of the token is generated based on a value that uniquely identifies the user or an account of the user;

post a demand message to a payment blockchain identified by information in the token, wherein the demand message notifies a provider of the selected payment method, wherein the provider of the selected payment method posts a remand transaction to the payment blockchain; and wherein the POS device is configured to receive, from the payment blockchain, a message indicating that the transaction is authorized.

14. The non-transitory computer readable program storage medium of claim 13, wherein the mobile device sends the token to the POS device, wherein the POS device is configured to generate and send the demand message to the payment blockchain.

15. The non-transitory computer readable program storage medium of claim 13, wherein the token does not include a credit card number, a bank number, or a debit card number associated with the selected payment method.

16. The non-transitory computer readable program storage medium of claim 13, wherein the list of one or more payment methods includes a first credit card from a first bank, a second credit card from a second bank, or a debit card from the first bank.

17. The non-transitory computer readable program storage medium of claim 13, wherein the personal information includes biometric information of the user or a passcode.

* * * * *